May 15, 1962 R. A. TUTTLE 3,035,255

MAGNETIC RECORDING SYSTEM

Filed Dec. 22, 1958 3 Sheets-Sheet 1

INVENTOR

Robert A. Tuttle

BY Sughrue & Rothwell

ATTORNEYS

May 15, 1962 R. A. TUTTLE 3,035,255

MAGNETIC RECORDING SYSTEM

Filed Dec. 22, 1958 3 Sheets-Sheet 2

INVENTOR
Robert A. Tuttle

BY Sughrue & Rothwell
ATTORNEYS 3,035,255
Patented May 15, 1962

3,035,255

MAGNETIC RECORDING SYSTEM

Robert A. Tuttle, Vestal, N.Y., assignor to International Business Machines Corporation, New York, N.Y.

Filed Dec. 22, 1958, Ser. No. 782,267
3 Claims. (Cl. 340—174.1)

This invention relates to a magnetic recording method and apparatus and more particularly to such method and apparatus for recording signals on a magnetic surface in accordance with a bias discrete spot (BDS) technique.

The NRZI (none-return-to-zero-IBM) method of writing involves a reversal in flux direction in the bit cell for recording 1's and no reversal in flux direction for recording 0's on a magnetic surface. Such a method finds particular utility at high bit densities but has been found to create one problem. This problem manifests itself in variations in amplitude and pulse width for various combinations of 1's and 0's in a word. This is particularly true when a single 1 is preceded and followed by a series of 0's. This particular case creates the most exensive variation in pulse width and amplitude but other bit combinations have been found to provide variations of a less serious nature. This problem creates a hazard during the read cycle. In the usual case the read amplifier requires an output pulse no greater than for instance 6 microseconds wide, so located in time that it can be sampled by the correct clock pulse only. If the data read from the magnetic surface is too wide, the output of the read amplifier may be so wide as to allow double sampling. If the output pulse width is controlled by the read amplifier it may occur too early in time to be sampled by the correct clock pulse.

It is therefore an object of this invention to provide a system for recording data on a magnetic recording surface whereby accurate readback signals are easily obtained.

More specifically, it is an object of this invention to provide a system for recording data on a magnetic recording surface whereby said stored data provides an accurately detectable point of reference to which the readback signals may be related.

In accordance with the present invention, there is provided a system for magnetically recording data as magnetized bits on a magnetic storage surface in which the surface is normally biased in one direction of magnetization and one type of data, i.e., binary 1, is recorded by reversing this bias for a short period of time within the bit cell and another type, i.e., binary 0, is recorded by perpetuating the bias within the whole or entire bit cell.

These and other objects will become apparent from a detailed description of the accompanying drawings.

Figure 1:
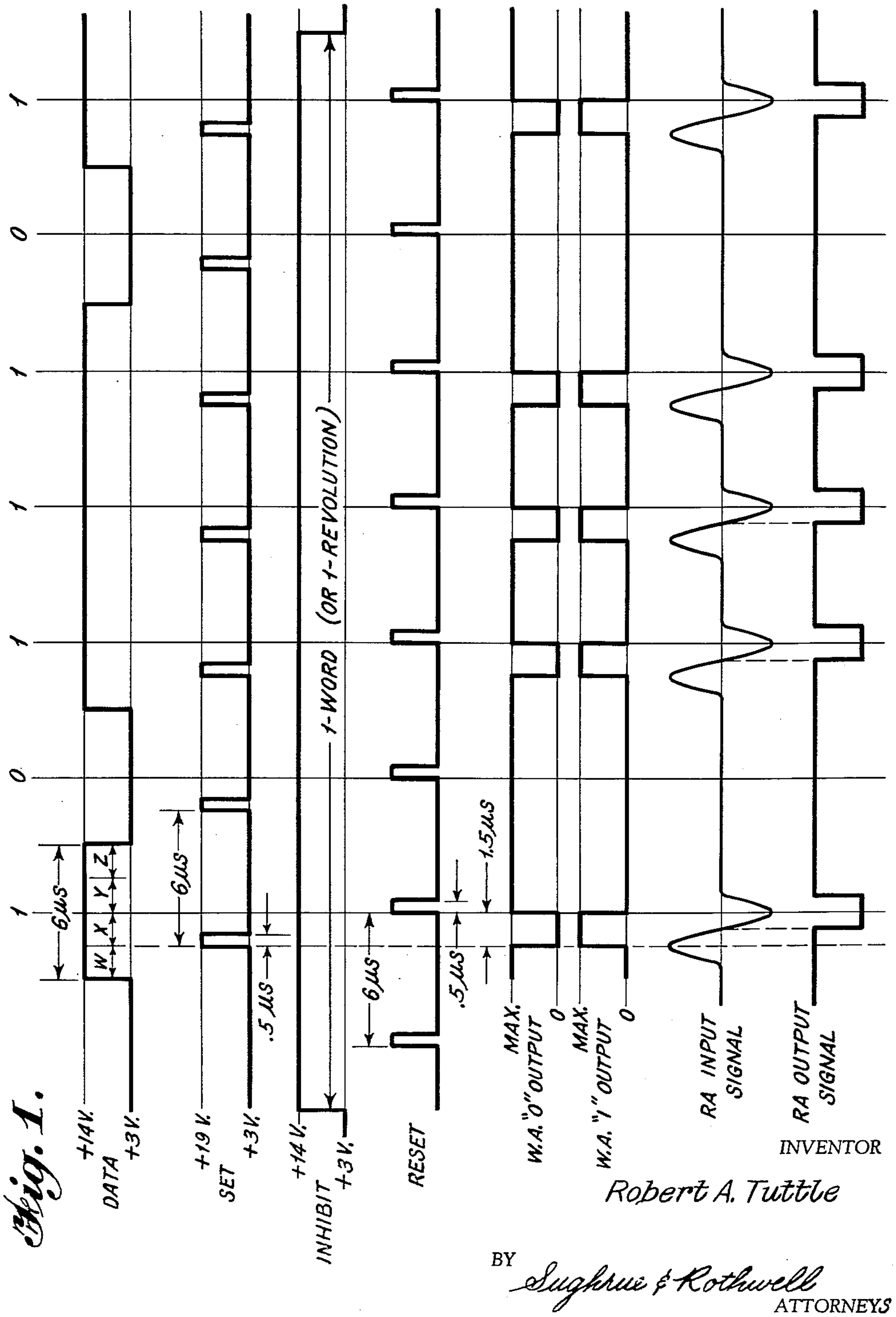
FIGURE 1 is a view showing a timing chart relating to the various signals present throughout the circuitry of the present invention.
Figure 2:
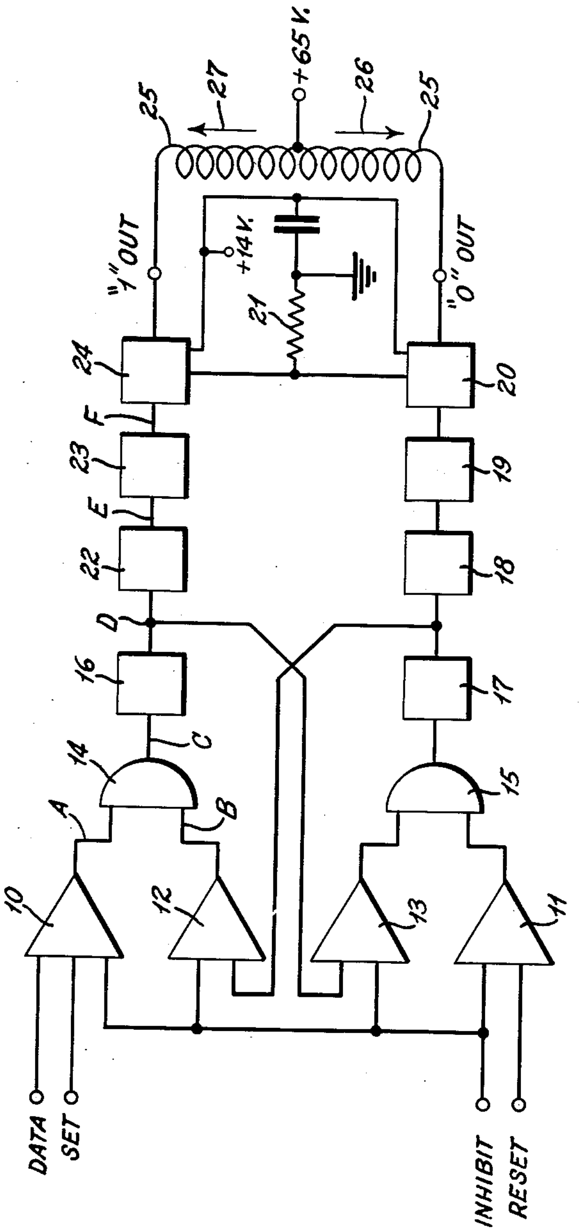
FIGURE 2 is a view showing a diagrammatic representation of the write amplifier constructed in accordance with this invention.

Referring to FIGURE 1, there are shown various wave forms which represent signals at specific points in the circuitry of this invention. These wave forms should be viewed with relation to the diagrammatic representation in FIGURE 2. Let it be assumed that the data to be written is the binary 101101. The inhibit line identified as Inhibit provides a +3 volts to the inputs to AND gates 10, 11, 12 and 13 when not writing and +14 volts when writing. The inhibit line goes to +14 volts immediately preceding the entry of the first data bit and remains there during the writing operation. The period of the inhibit signal may be anywhere between one word and one revolution of a cyclically operated magnetic recording surface such as a drum. To insure that the write amplifier of FIGURE 2 is in the 0 state prior to entry of data thereto, the inhibit line goes up immediately preceding the first data bit cell. The occurrence of the first reset pulse on the line identified as Reset unblocks gate 11. This reset pulse is manifested by a pulse from +3 volts to +19 volts at the input to gate 11. The reset pulses like the set pulses occur in periodic fashion within the bit cells and each are .5 microsecond in duration. In this particular case the bit cells are assumed to be 6 microseconds in duration and divided into four clock periods, namely, W, X, Y and Z, each of 1.5 microseconds in duration. The reset pulse occurs during Y time. The first reset pulse applied while the inhibit line is up provides a positive pulse output from AND gate 11 to OR gate 15. The output pulse from gate 15 is inverted by inverter 17 and again by inverter 18. The emitter follower 19 provides a positive pulse to inverter 20. This turns on inverter 20. Current then flows through the write head winding 25, through the inverter 20, the load resistor 21 to ground in the direction indicated by the arrow 26. At the same time AND gate 10 is blocked to provide a down level to OR gate 14, a down level to inverter 16, an up level to inverter 22, a down level to emitter follower 23, shutting off the inverter 24. AND gate 12 is blocked by output level of inverter 17. The write amplifier is now in the zero state and ready for writing. The Data signals then proceed to enter on the Data line to AND gate 10. When the set pulse of .5 microsecond duration occurs during the first data bit cell at X time, the output of the AND gate 10 is up, the output of OR gate 14 is up, the output of inverter 16 is down, inverter 22 is up, emitter follower 23 is up to turn on inverter 24. Current then flows through the winding 25 in the direction indicated by the arrow 27 through inverter 24, the load resistor 21, to ground. At this time the output of AND gate 11 is down turning off inverter 20 and, because of uplevel output of inverter 17, inverter 24 stays on until the occurrence of the next reset pulse to gate 11 which occurs at Y time. Between reset pulses the output of gate 11 is down providing an up level from inverter 17 to AND gate 12, unblocking this gate to provide an up level to inverter 16. This insures that inverter 24 stays on from the initiation of the set pulse at X time during the 1 data bit cell to the beginning of the reset pulse at Y time during this data bit cell. This provides a current pulse through the winding 25 of 1.5 microseconds. If the data represents a 0, the up level at the output of inverter 16 is coupled to the AND gate 13 to unblock this gate and provide an up level to inverter 18. This insures that inverter 20 stays on from the initiation of the reset pulse until the occurrence of the next set pulse in a 1 data bit cell.

It will be noted that OR gates 14 and 15, inverters 16 and 17, and AND gates 12 and 13 function as a latch. A latch is a two-state device having at least one set and one reset input and one set and one reset output. A set latch is reset only by an input to its reset input and a reset latch is set only by an input to its set input. If we consider that a positive pulse is fed to OR gate 14 (the set input to a latch), it provides a down level at the output of inverter 16. This down level is coupled to AND gate 13 to provide a down level output therefrom. This provides an up level output from inverter 17 (the reset output of the latch), which is coupled to AND gate 12, to OR gate 14, to maintain the output of inverter 16 at the down level. The latch is now set. It can be reset by applying a positive pulse to OR gate 15 (the reset input of the latch), which provides a down level output from inverter 17. This down level output is coupled to block AND gate 12 to provide a down level therefrom through OR gate 14 to the input of inverter 16. This provides an up level output from inverter 16 which is coupled back to the inverter 17 through AND gate 13 and OR gate 15. The latch is set upon the occurrence of a set pulse during a 1 data bit cell and is reset upon the occurrence of a reset pulse. Of course it is assumed that the inhibit line is up since we are interested only in the functioning of the latch during the writing period. Consequently, the write amplifier includes means to introduce during the write operation a data signal in a data bit cell to set the latch to provide a 1 output signal therefrom to the write head and means to introduce a reset signal to the latch during the data bit cell subsequent to the data signal to reset the latch to restore the bias condition on the magnetic surface.

Figure 3:
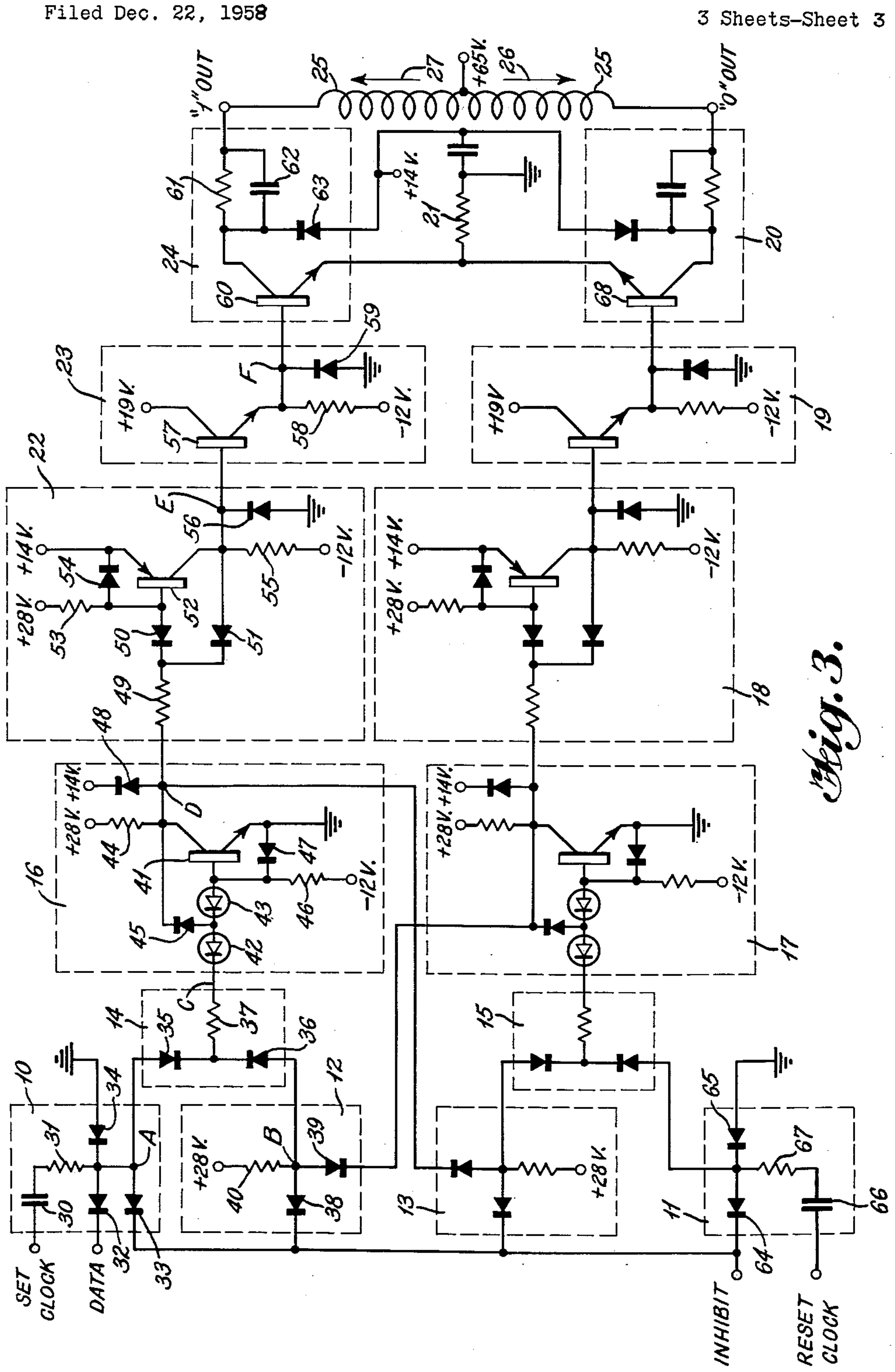
FIGURE 3 is a view showing a circuit diagram of one type of write amplifier which may be employed in accordance with the present invention.

Turning now to FIGURE 3, there is shown a circuit diagram of one type of write amplifier that may be employed in accordance with this invention. AND gate 10 and associated circuitry includes the condenser 30 connected to one end of the resistor 31. The other end of resistor 31 is connected to the cathode of clamping diode 34 and the plates of diodes 32 and 33. Normally the point A when this gate is blocked is maintained at approximately ground level by the clamping diode 34 whose plate electrode is connected to ground. Upon the simultaneous application of up levels to the Set, Data and Inhibit lines point A rises to approximately 14 volts. OR gate 14 and associated circuitry includes diodes 35 and 36 with cathodes connected to load resistor 37. Inputs to OR gate 14 are from point A connected to the plate of diode 35 and from point B connected to the plate of diode 36. AND gate 12 and associated circuitry includes the diodes 38 and 39 and resistor 40 connected between +28 volts and the plate electrodes of these diodes. Point B is normally at a down level but upon the simultaneous application of up levels to the cathodes of diodes 38 and 39, point B rises to an up level. Upon the application of an up level at either point A or point B, point C rises to an up level. The inverter 16 and associated circuitry includes the NPN transistor 41, the series connected Zener diodes 42 and 43, the load resistor 44 coupled between +28 volts and the collector electrode of transistor 41, the diode 45 connected between the collector of transistor 41 and the junction of Zener diodes 42 and 43, the resistor 46 connected between —12 volts and the base of transistor 41, and the diode 47 connected between the emitter electrode of transistor 41 and the base electrode thereof. The transistor has its emitter electrode grounded. The inverter also includes the clamping diode 48 connected between the collector electrode of the transistor 41 and +14 volts. The Zener diodes 42 and 43 function to raise the input impedance to the inverter when the input is down. They are used to control the collector voltage when the transistor 41 is conducting. The diode 45 functions to bypass current normally going into the base to the collector. The diode 47 functions to prevent the base from going too far negative—to about —1 volt. It can be seen that when point C is at an up level the transistor 41 is biased to a highly conducting state and point D is at a relatively down level. However, when point C is at a down level the transistor is substantially shut off and point D is at a relatively up level.

The inverter 22 and associated circuitry includes the resistor 49 connected between point D and the cathode electrode of diodes 50 and 51. The plate electrode of diode 50 is connected to the base of transistor 52 which is a PNP-type transistor. The plate electrode of diode 51 is connected to the collector electrode of transistor 52. The resistor 53 is connected between +28 volts and the base electrode of transistor 52. The emitter electrode of transistor 52 is connected to +14 volts. The diode

54 has its cathode connected to +14 volts and its plate connected to the base of transistor 52. The load resistor 55 is connected between —12 volts and the collector electrode of transistor 52. The clamping diode 56 has its plate connected to ground and its cathode connected to the collector of transistor 52 to prevent said collector from going below ground. It can be seen that if point D is at a relatively up level the transistor 52 is not conducting and point E is at a relatively down level. If point D is at a down level, transistor 52 is conducting and point E is at a relatively up level.

The emitter of follower 23 and associated circuitry includes the NPN-type transistor 57 having its collector electrode connected to +19 volts. Its emitter electrode is connected through resistor 58 to —12 volts. The clamping diode 59 has its cathode connected to the emitter electrode of transistor 57 and its plate connected to ground to prevent the said emitter electrode from going below ground. It can be seen here that if point E is at a relatively up level the transistor 57 is conducting and point F is at a relatively up level. If point E is at a relatively down level then transistor 57 is not conducting and point F is at a relatively down level.

The inverter 24 and associated circuitry includes the NPN-type transistor 60 having its collector electrode connected through the resistor 61 to the one output terminal of the write head winding 25. Resistor 61 is shunted by condenser 62. Diode 63 has its cathode connected to the collector electrode of transistor 60 and its plate connected to +14 volts. The emitter electrode of transistor 60 is connected through the common feedback resistor 21 to ground. It can be seen here that if point F is at a relatively down level transistor 60 is cut off and the one output terminal is at a relatively up level preventing current flow through that part of the winding connected between +65 volts and the one output terminal. However, if point F is at a relatively up level transistor 60 is conducting which drops the level of the one output terminal to provide current flow in the direction of the arrow 27.

AND gate 11 is provided with the inhibit signal and the reset pulse. It includes the diode 64 having its cathode connected to the inhibit line and its plate to the cathode of clamping diode 65. Diode 65 has its plate connected to ground. The condenser 66 couples the reset pulse to resistor 67 which in turn is connected to the cathode of diode 65. AND gate 13 is constructed and functions similarly to AND gate 12, OR gate 15 to OR gate 14, inverter 17 to inverter 16, inverter 18 to inverter 22, emitter follower 19 to emitter follower 23, and inverter 20 to inverter 24. In the event that inverter 24 is conducting current flows in the direction of arrow 26 through winding 25. Resistor 21 prevents transistor 60 from going into conduction until transistor 68 of the inverter 20 goes out of conduction and vice versa. It serves to balance both sides of the amplifier.

Indications of the binary information stored on the magnetic recording surface are obtained by a read head with suitable winding thereon and a read amplifier—both of conventional design.

It can be seen, then, that the method and apparatus of this invention records digital data on a magnetic surface by continuously biasing the surface in one direction within a bit cell for one type of data and reversing said direction for a short period of time within a bit cell for another type of data. The "1" channel providing current in winding 25 in the direction of arrow 27 is conducting only for a short period of time during a bit cell to record a 1 and the "0" channel is otherwise conducting. Both channels cannot conduct simultaneously.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit on the invention. It is the intention, therefore, to be limited only as indicated by the scope of the following claims.

What is claimed is:

1. Apparatus for recording digital data on a magnetic surface comprising first means having inputs and an output for generating a first output signal in response to the concurrent application of a plurality of input signals including a data signal, second means having inputs and an output for generating a second output signal in response to the concurrent application of a plurality of other input signals including a data terminating signal, third means coupling the inputs and outputs of said first and second means so as to allow only one or the other of said first and second output signals to be generated at a time and means for recording said output signals on said surface.

2. Apparatus for recording two types of data within bit cells on a magnetic recording surface comprising a bistable latch having set and reset stable states and having set and reset inputs and outputs, a bi-directional current recording transducer for recording said data on said surface, means connecting said set output of said latch to said transducer to drive current through said transducer in one direction for a short period of time within a bit cell to record one type of data, means connecting said reset output of said latch to said transducer continuously to drive current through said transducer in an opposite direction within a bit cell to record another type of data and means to apply signals indicative of said data to be recorded to said set and reset inputs to said latch.

3. Apparatus as defined by claim 2 wherein said last mentioned means induces means to apply signals to said set input to said latch during a one type of data bit cell to set said latch and means to apply signals to said reset input to said latch adapted to reset said latch during each bit cell.

References Cited in the file of this patent

UNITED STATES PATENTS

| | | |
|---|---|---|
| 2,838,675 | Wanlass | June 10, 1958 |
| 2,862,199 | Scott | Nov. 25, 1958 |
| 2,894,796 | Reynolds | July 14, 1959 |